Figure 1:
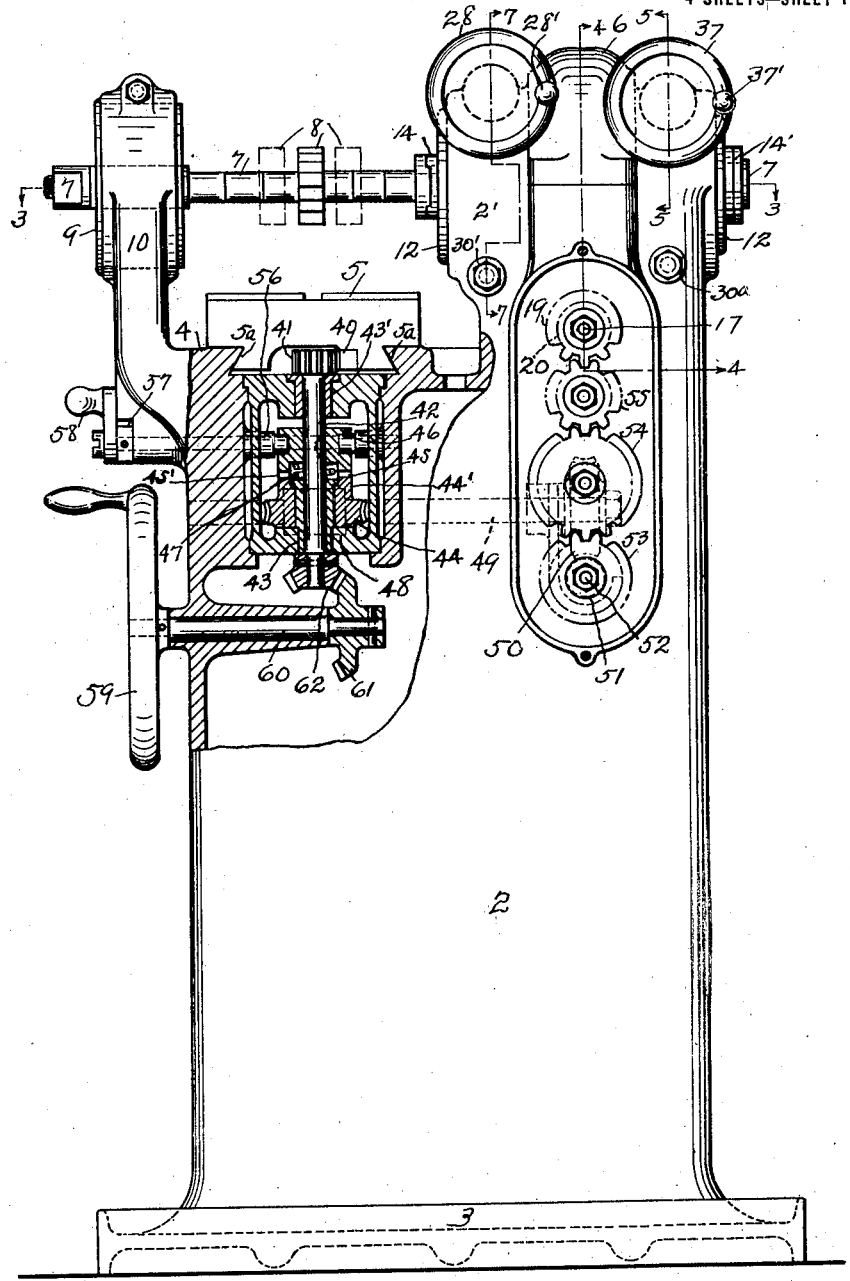

C. GABRIELSON.
MILLING MACHINE.
APPLICATION FILED NOV. 23, 1917. RENEWED MAY 13, 1920.

1,369,416.

Patented Feb. 22, 1921.
4 SHEETS—SHEET 1.

WITNESSES:
David A. Nilsson

INVENTOR
Carl. Gabrielson

BY
Harry D. Wallace
ATTORNEY

C. GABRIELSON.
MILLING MACHINE.
APPLICATION FILED NOV. 23, 1917. RENEWED MAY 13, 1920.

1,369,416.

Patented Feb. 22, 1921.

4 SHEETS—SHEET 3.

WITNESSES:
David A. Nilsson

INVENTOR
Carl Gabrielson.
BY
Harry D. Wallace
ATTORNEY

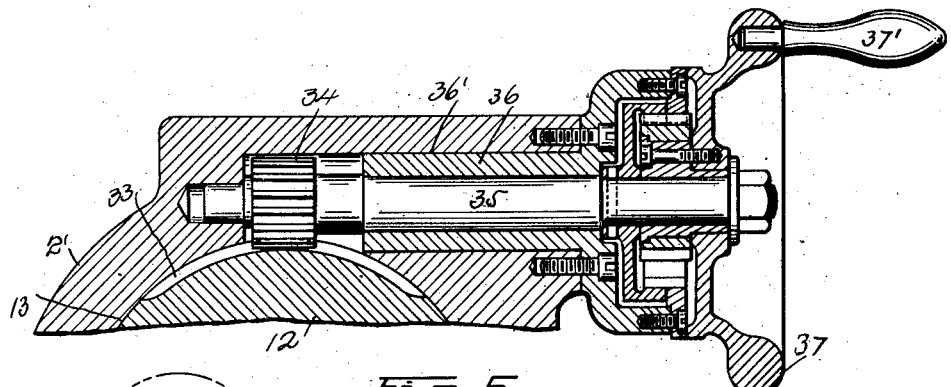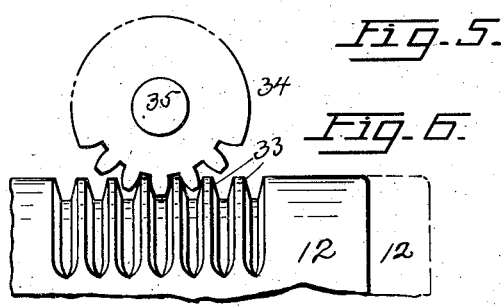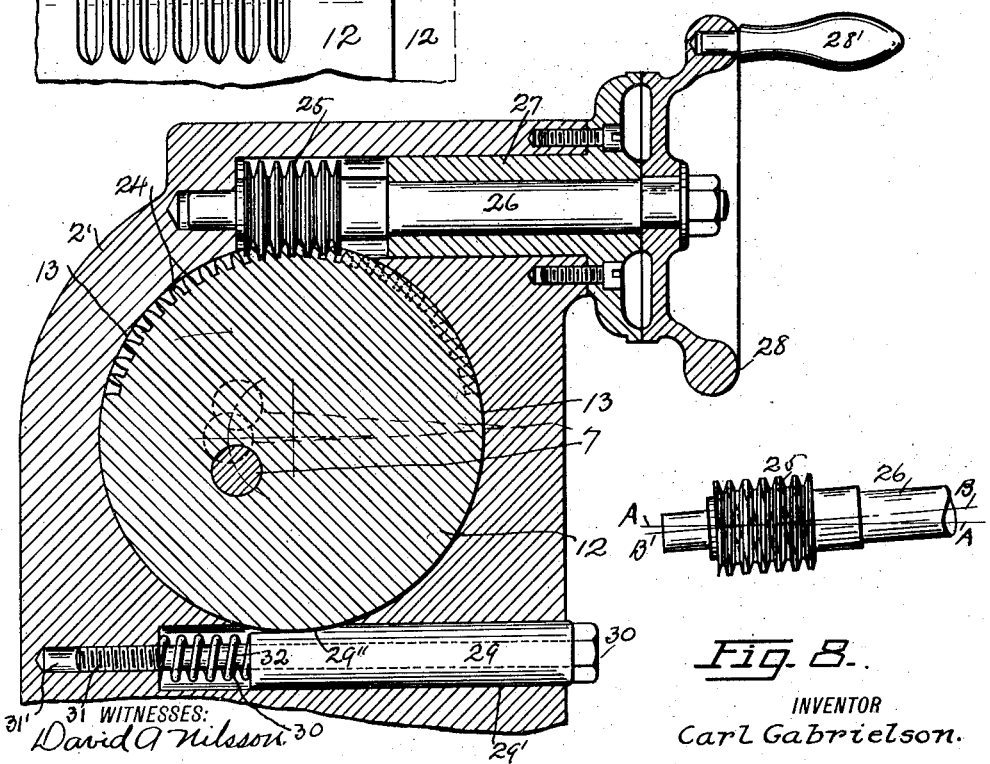

UNITED STATES PATENT OFFICE.

CARL GABRIELSON, OF SYRACUSE, NEW YORK, ASSIGNOR TO GABRIELSON MANUFACTURING CORPORATION, OF SYRACUSE, NEW YORK, A CORPORATION OF NEW YORK.

MILLING-MACHINE.

1,369,416.  Specification of Letters Patent.  Patented Feb. 22, 1921.

Application filed November 23, 1917, Serial No. 203,609. Renewed May 13, 1920. Serial No. 381,218.

*To all whom it may concern:*

Be it known that I, CARL GABRIELSON, a citizen of the United States, residing at Syracuse, in the county of Onondaga and State of New York, have invented certain new and useful Improvements in Milling-Machines, of which the following is a specification.

This invention relates to improvements in milling machines and the like, and has for its object to provide a novel and more simple and powerful drive-mechanism for the operative parts of milling machines generally. A further object is to provide novel and simple means for adjusting the spindle, which supports and operates the cutters, longitudinally and vertically relatively to the work-supporting table.

The present invention relates particularly to what is known as manufacturing or plain milling machines, as distinguished from the common universal millers, and wherein the work to be performed by the machines usually comprises the milling of similar or stock parts which enter into the structures of various products. The majority of the "plain" milling machines now in use are too expensive for the ordinary manufacturing work, principally because they comprise too complicated table adjusting and locking mechanisms. Furthermore, the said adjusting mechanisms of the older machines have been found by applicant to be more or less faulty and unreliable, thereby contributing to many inaccuracies which must be afterward corrected. A particular objection to these older machines has been found to arise from the fact that the principal adjusting and locking means, as a rule, have been located near, or have been associated with the work-supporting tables, which are usually adjustable longitudinally, vertically, as well as transversely, while the spindles, as a rule, are non-adjustable, and owing to the location and arrangement of such adjusting mechanisms, the work-supporting tables are subject to more or less lost-motion or looseness, which frequently allows them to yield, spring or chatter under the heavy pressure necessarily exerted by the cutters upon the metal articles operated upon while doing their work.

It is a particular object of my invention to provide a novel and strong support for the cutter-supporting spindle, and to utilize the said support for the principal adjusting element, for providing all adjustments of the cutters relatively to the work upon the table. A further particular object is to provide a work-supporting table, which is limited to the longitudinal adjustment, the said table being preferably operatively supported upon a substantial stationary bed or support, forming a part of the body of the machine. A further particular object is to apply improved and powerful locking means to the new spindle support, the said adjusting and locking means being entirely disassociated with the work-table. And a further object is to generally improve and simplify the construction and operation, as well as to reduce the cost of milling machines of the class.

I attain these objects by the means set forth in the detailed description which follows, and as illustrated by the accompanying drawings, in which—

Figure 2:
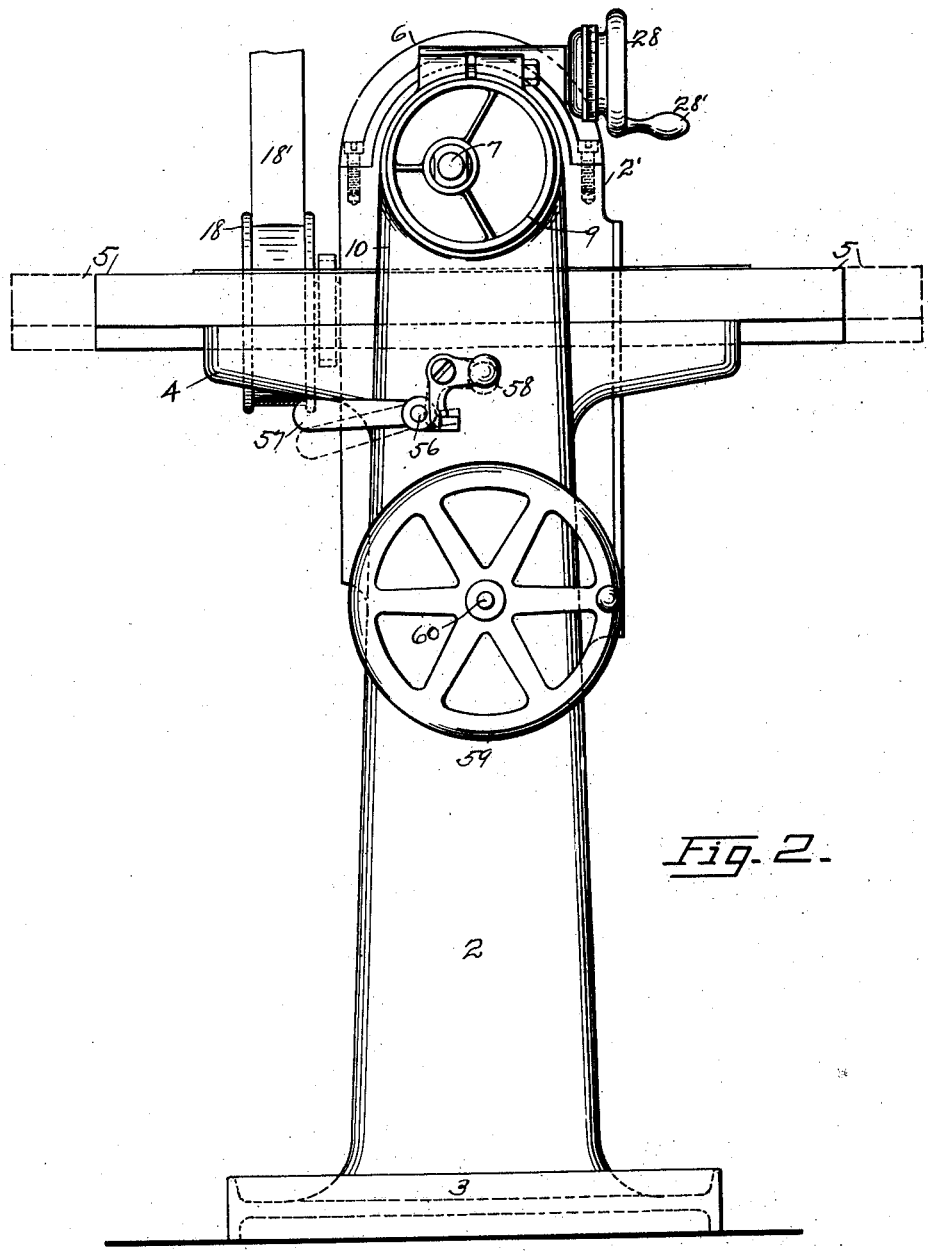
Figure 3:
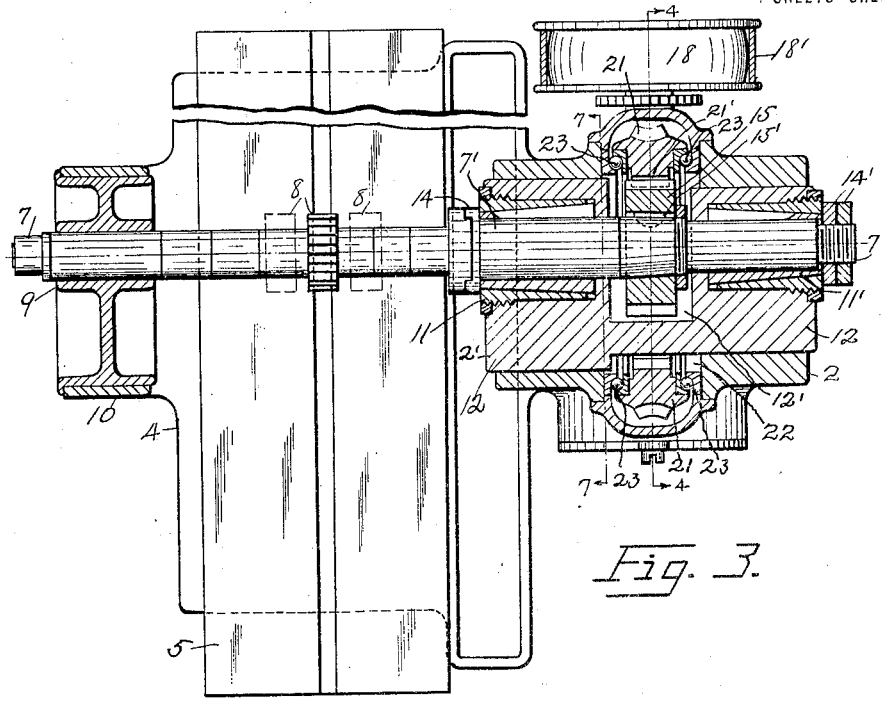
Figure 4:
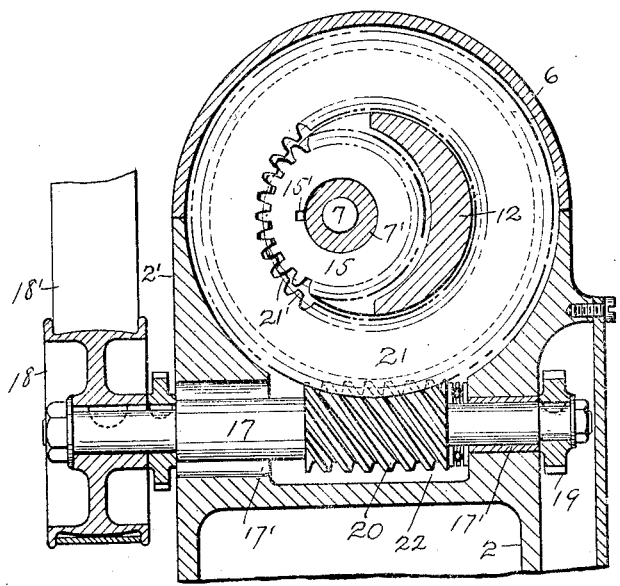

Figure 1 is a side elevation, with parts broken away, of the complete milling machine. Fig. 2 is an end elevation of the same. Fig. 3 is a horizontal section, taken on line 3—3 of Fig. 1. Fig. 4 is an enlarged vertical section, taken on line 4—4 of Figs. 1 and 3; showing the main driving mechanism for the spindle. Fig. 5 is an enlarged vertical section, on line 5—5 of Fig. 1; showing the mechanism for adjusting the spindle horizontally. Fig. 6 is an enlarged view of the worm and gear parts shown in Fig. 5. Fig. 7 is an enlarged section, on line 7—7 of Figs. 1 and 3; showing the mechanism for adjusting the spindle vertically; also showing the novel and powerful means for locking the spindle in the adjusted positions. Figs. 8 is a detail of the worm shown in Fig. 7.

In the drawing, 2 represents the body of the milling machine, which is preferably of the plain or manufacturing type, having near its upper end a laterally extending bed or ledge, 4, upon which is movably disposed the usual work-supporting table. The top face of the bed 4 and the underside of the table 5 are provided with the usual dovetail structure, as best seen at 5ª in Fig. 1. The table 5 is preferably only movable longitudinally, by a feeding mechanism which will be described later on. The body 2 is preferably hollow and extends above the work table 5 and is fitted with a cap 6.

7 represents the spindle which supports and operates the rotary cutters, as 8. The spindle 7 preferably extends horizontally through the extended top 2' of the body, thence across the table 5 and its adjacent end is journaled in an eccentric bearing 9, which is movably supported in an upwardly extending arm 10, which may be integral with the bed 4, as shown in Figs. 1, 2 and 3. The opposite end of the spindle has an enlarged diameter, preferably increased by a sleeve 7', and is journaled in oppositely arranged spaced cone bearings 11 and 11', the latter being suitably threaded into the opposite ends of a relatively heavy sleeve or cylindrical support 12, which is movably supported for rotary and longitudinal adjustment in a suitable horizontal opening or bore 13 in the body 2'. The spindle 7 is held from endwise movement in the sleeve 12 by nuts 14—14', in the usual manner. It will be seen by reference to Figs. 2, 3, 4 and 7 that the spindle 7 is disposed eccentrically in the sleeve 12, corresponding to the positioning of said part in the bearing 9. The sleeve 12 has two diameters, and the opening 13 in the body 2' is arranged the same. The sleeve 12 also has a transverse cut-out or notch 12' intermediate its ends, as best seen in Fig. 3. The said cut-out extends circumferentially from the top of the sleeve to a point below the longitudinal center, and within this cut-out is disposed a spur-gear 15, which is rigid on the spindle 7 (see Figs. 3 and 4) by means of a key 15'.

The drive for the spindle consists of the following novel and powerful mechanism: 17 represents a shaft, which is suitably journaled at 17' in the body 2', parallel to and preferably in the same plane as the table 5. One end of shaft 17 is fitted with a pulley 18, which may be driven by a belt 18'. The opposite end of said shaft is fitted with a spur-gear 19 for driving the table-feeding mechanism. Intermediate its ends shaft 17 supports a worm 20, which meshes with and drives a worm-gear 21, the latter being suitably positioned in a hollow or cavity 22 of the body 2' extending upwardly from the worm 20. The gear or member 21 is preferably supported at its opposite sides by ball-bearings 23, which in turn are supported by the body 2' (see Fig. 3). The gear or member 21 is preferably a ring, and its inner circumference is provided with teeth 21', which mesh with and drive the spur-gear 15 carried by the spindle 7 (see Figs. 3 and 4). The annular member 21 preferably encircles the sleeve 12 and is concentric to said sleeve. By the provision of the worm 20 and the gears 21 and 15, I am able to greatly increase the power of the spindle drive, by the employment of but a few simple and compactly arranged parts. The spur-gear 15 is preferably considerably smaller in diameter than the internal gear 21', which permits the spindle 7 and the gear 15 to be disposed eccentrically within the gear 21. This construction and arrangement enables me to provide in a novel way for the adjustment of the spindle 7 and the cutters 8 vertically, toward and away from the table 5, for compensating for the gradual wearing away of the cutters by frequent grinding or sharpening of the same. The said construction also permits the cutters to be adjusted readily, quickly and accurately for increasing and decreasing the depth of the cuts upon certain kinds of work (see range of adjustment of spindle shown by full and dotted lines in Fig. 7).

The adjustment of the spindle vertically, as described, is accomplished in the following manner: Referring to Fig. 7, the enlarged end of the cylindrical sleeve 12 is journaled in the body 2', and upon its outer top surface is provided a series of teeth 24, which are engaged by a worm 25, the latter being rigid on a shaft 26, which is partially journaled in a stationary sleeve 27 and partially in the body 2'. The outer or right end of the shaft 26 is fitted with a handwheel 28 having a handle 28', by which the shaft 26 and the worm 25 are rotated, for raising and lowering the spindle 7 relatively to the table 5, to the extent shown by full and dotted lines or circles in Fig. 7, in which the full lines show the greatest adjustment downwardly, while the dotted lines show the mean, as well as the greatest adjustment of the spindle upwardly, it being understood that the arc through which the spindle is adjustable is concentric with the center of the annular member 12 so that in any position of adjustment the spur gear 15 will remain in complete mesh with the gear teeth on the inner circumference of said member 12. It will be seen that the bearing 9 must rotate correspondingly to the sleeve 12 during the vertical adjustment of the spindle and cutter.

In carrying out many of the milling operations on machines of the character shown and described, it is necessary to frequently adjust the cutter 8 horizontally for increasing or truing up the cuts, or for the purpose of setting the cutters for doing exact work after the article to be operated upon has been secured to the table 5. The horizontal adjustment of the cutter and spindle is accomplished by the following means: Referring to Figs. 5 and 6, the top surface of the smaller portion of the sleeve 12 is provided with circumferential mutilated threads 33, which are engaged by a spur-gear 34, the latter being rigid on a shaft 35, the greater portion of which is journaled in a sleeve 36 rigid in a suitable bore or opening 36' of the body 2', and preferably disposed parallel to the parts 26 and 27. The outer end of the shaft 35 is fitted with a hand-wheel 37, having a handle 37', by which said shaft and gear 34 are manipulated. The turning of shaft 35 and gear 34 in opposite directions moves the main sleeve 12 and also the spindle horizontally correspondingly, for adjusting the cutter relatively to the table 5, as shown by the full and dotted lines in Fig. 1. For this purpose the gear 15 is broader than the internal gear 21', as shown.

In order to insure perfect and accurate work by the cutters 8, it is necessary to rigidly hold the spindle in either position to which it may be adjusted, and for this purpose, I provide a lock which comprises a sleeve 29, which is movable longitudinally in a bore or hole 29' in the body 2'. A bolt 30 passes loosely through the sleeve 29, the outer end of the bolt having a head by which it may be manipulated, while the opposite end is threaded at 31 and screws into a threaded socket 31'. The turning of the bolt 30 in one direction forces the sleeve 29 inwardly so that a flat or wedge-like portion 29'' frictionally engages the periphery of the main sleeve 12, at the greatest distance from its axis and firmly holds the latter from movement in any direction. A second similar locking device for sleeve 12 (not shown in detail) is indicated by 30ª in Fig. 1. The turning of the bolts 30 in the opposite direction releases the locking sleeves by the expansion of springs 32.

Fig. 8 is a view of the worm 25 shown in Fig. 7. As this worm is constantly in engagement with the teeth 24, in order to permit the sleeve 12 to be shifted endwise, the worm 25 is disposed at an angle relatively to the said teeth, as indicated by the broken lines A—B in Fig. 8, in which the line A indicates the right line across the threads 24, while the line B indicates the amount of skew or angularity of the worm required to allow the sleeve 12 to be moved endwise, as described.

The automatic feeding mechanism for the table 5 consists of a rack 40 disposed on the bottom-side of the table, which is engaged by a pinion 41 mounted upon the upper end of a shaft 42, which is journaled in bushings 43 and 43' (see Fig. 1). 44 represents a worm journaled on the bushing 43 having a hub 44', the upper side of which is provided with clutch teeth 45. 46 represents a collar or sleeve which is keyed to and therefore movable with shaft 42 above and concentric to the hub 44', the said collar having clutch teeth 45'. The collar 46 is slidable on shaft 42 and is normally held out of engagement with the hub 44' by a spring 47, the latter being interposed between the collar and said hub. 48 represents a worm for driving the gear 44 and is mounted on a shaft 49, the said shaft also supporting a worm-gear 50, which is driven by a worm 51 carried by a shaft 52. Shaft 52 supports a spur-gear 53, which is driven through intermediate gears 54 and 55 by the gear 19 carried by the shaft 17. 56 represents a crank-shaft, one end of which connects with the collar 46, the outer end of said shaft being fitted with a lever 57 (see Fig. 2). The setting of the lever 57 in the horizontal position, as shown, moves the collar 46 downwardly and engages the clutch teeth 45—45', and permits the feeding of the table 5, through the working of the several worms and gears above described. The lever 57 is held in the operative position by a bell-crank latch 58. The release of the latch 58 allows the spring 47 to separate the collar 46 from the hub 44' for stopping the feeding of the table 5.

In case it is desired to feed the table 5 by hand, the clutch 45—45' is first released, as described, after which the operator manipulates a hand-wheel 59 mounted on a shaft 60, to the inner end of which is fitted a bevel-gear 61, which meshes with a similar gear 62 carried by the lower end of shaft 42. The turning of the wheel 59 in opposite directions reciprocates the table 5 the same as the automatic feeding mechanism referred to.

The foregoing describes my invention.

What I claim, is—

1. The combination with a work-table and a frame, of a cylindrical sleeve rotatably and slidably supported in said frame, a cutter spindle journaled in said sleeve, an annular gear surrounding said sleeve constantly in mesh with a pinion carried by said spindle adapted to drive said spindle independently of said sleeve, a worm engaging mutilated teeth on said sleeve for rotating said sleeve for adjusting said spindle vertically relatively to said table, and means for locking said sleeve in the adjusted positions.

2. In a milling machine, a cutter spindle, a longitudinally and vertically movable support in which said spindle is journaled eccentrically, said support having mutilated circumferential threads and a series of longitudinal teeth, a worm engaging said teeth for partially rotating said support, a gear engaging said threads for adjusting said support longitudinally, a pinion carried by said spindle, an annular gear surrounding said support and said spindle having internal teeth engaging and driving said pinion, and a worm for driving said annular gear.

3. A milling machine including a work-table, a cutter-spindle, a rotatable-reciprocatable support for said spindle, an annular driving member encircling said support and said spindle having worm-gear teeth formed in its periphery, its inner surface comprising an internal gear, a pinion rigid on said spindle disposed eccentrically in said membar and said support and meshing and driven by said internal gear, means for moving said spindle toward and away from said table without disturbing said spindle driving mechanism, and independent means for moving said support and said spindle longitudinally without unmeshing said pinion and said internal gear.

4. The combination with a frame and a work-table, of a cylindrical sleeve journaled horizontally in said frame above said table, a cutter-spindle journaled eccentrically in said sleeve, a bolt and wedge for locking said sleeve against rotation, a pinion rigid on said spindle, an annular driving member surrounding said sleeve and engaging and driving said pinion, and an eccentric bearing supporting the free end of said spindle.

5. In a milling machine, the combination with the spindle and a pinion carried by said spindle, of an annular member having internal teeth meshing and driving said pinion, said member arranged eccentrically to the axis of said spindle and pinion for permitting the adjustment of the spindle and pinion, and a worm engaging the periphery of said member for driving said parts.

6. In a milling machine, the combination with a table and a cutter carrying spindle, of a cylindrical support in which said spindle is eccentrically journaled, said support having a series of teeth on its exterior surface extending longitudinally thereof, means comprising a worm engaging said teeth for rotating said support to raise and lower the spindle, means for driving said spindle and means independent of said driving means for moving said support endwise.

7. In a milling machine, the combination with a table and a cutter carrying spindle, of means for raising and lowering said spindle, a pinion rigid on said spindle, an annular driving member surrounding said spindle, said spindle being arranged eccentrically in said member, the inner circumference of said driving member having teeth meshing with and driving said pinion, the outer circumference of said member comprising a worm gear, a worm meshing with and driving said member and means for driving said worm.

8. In a milling machine, the combination with a table and a cutter carrying spindle, a pinion rigid on said spindle, an annular driving member surrounding said spindle, said spindle being arranged eccentrically in said member, the inner circumference of said driving member having teeth meshing with and driving said pinion, the outer circumference of said member comprising a worm gear, a worm meshing with and driving said member, means for driving said worm, and means for bodily moving said spindle in an arc corresponding to the inner circumference of said annular member whereby said spindle is moved toward and from said table.

9. In a milling machine, a spindle supporting a cutter above a work-table, a cylindrical support in which said spindle is journaled eccentrically, an annular driving member surrounding said spindle having internal teeth, the periphery of said member having worm-teeth, a pinion carried by said spindle meshing and driven by said internal teeth, a worm engaging and driving said member, means for rotating said support for adjusting said spindle vertically relatively to said table, and means for reciprocating said spindle for adjusting the cutter horizontally relatively to the table.

In testimony whereof I affix my signature.

CARL GABRIELSON.